United States Patent [19]
Adam et al.

[11] Patent Number: 5,444,315
[45] Date of Patent: Aug. 22, 1995

[54] BUSHING ISOLATOR FOR LEAD-THROUGH OF ELECTRICAL LINES PROVIDING MOISTURE SEALING BETWEEN TWO HOUSINGS

[75] Inventors: Peter Adam, Höchberg; Peter Michel, Kleinrinderfeld, both of Germany

[73] Assignee: Siemens Aktiengesellschaft, München, Germany

[21] Appl. No.: 993,160

[22] Filed: Dec. 18, 1992

[51] Int. Cl.⁶ ............................................. H02K 15/00
[52] U.S. Cl. ....................................... 310/42; 310/71; 310/249
[58] Field of Search ............... 310/42, 43, 45, 71, 310/88, 235, 239, 249

[56] References Cited

U.S. PATENT DOCUMENTS

| | | |
|---|---|---|
| 4,518,886 | 5/1985 | Kaneyuki .................. 310/88 X |
| 4,713,568 | 12/1987 | Adam et al. ................. 310/112 |
| 4,978,876 | 12/1990 | Koster ...................... 310/239 |
| 5,041,751 | 8/1991 | Yokozuka ................... 310/239 |

FOREIGN PATENT DOCUMENTS 3804677 8/1989 Germany.
3823404 1/1990 Germany.

*Primary Examiner*—Thomas M. Dougherty
*Assistant Examiner*—E. To
*Attorney, Agent, or Firm*—Kenyon & Kenyon

[57] ABSTRACT

Electrical lines for two axially located housings are molded into an inelastic carrier and covered at both faces of the carrier. A seal is injection-molded onto the inelastic carrier. In one implementation in which the carrier is disposed between a commutator housing and a gear housing, the inelastic carrier engages a brush holder that is inserted into one housing of the commutator motor. The design enables the electrical lines to pass into the interior of two axially located housings in a simple manner, while guaranteeing a reliable moisture seal between the housings.

19 Claims, 4 Drawing Sheets

BUSHING ISOLATOR FOR LEAD-THROUGH OF ELECTRICAL LINES PROVIDING MOISTURE SEALING BETWEEN TWO HOUSINGS

BACKGROUND OF THE INVENTION

The present invention relates to a bushing isolator for electrical lines. More particularly, the present invention relates to a bushing isolator for simultaneous lead-through of electrical lines between two housings or housing parts with complete moisture sealing between front sides of the two housings or housing parts.

In a bushing isolator disclosed in German Patent Document No. DE-A1-38 23 404, a continuous seal is arranged between the flange-like face edges of the housings to form a moisture-tight seal between two housing openings. Electrical cables that lead from the exterior into the interior of the motor housing are injection-molded within the seal, to which pressure is applied on both sides by the continuous face edges of the housings. In a commutator motor, a cover part is locked into place on a brush holder carrier that can be inserted into the motor housing. The seal that surrounds the electrical lines is locked into place or injection-molded onto the outside of this cover part.

In another bushing isolator described in German Patent Document No. DE-A1-38 04 677, a seal disk that covers a face edge of the housing serves as a support surface for a circuit board. External connection lines are soldered to the circuit board.

SUMMARY OF THE INVENTION

An electrical line connection that guarantees a complete moisture seal between two housings is achieved with the present invention. Furthermore, this electrical line connection is simple to produce and assemble.

A uniform seal is guaranteed over the entire sealing region between the surface of two housings by providing the electrical lines, which preferably consist of punched and bent sheet metal parts, in an inelastic carrier, and by applying a continuous seal that is free of electrical lines passing through it, on the surface of the inelastic carrier. A uniform sealing function is assured due to constant elasticity and a uniform surface over the entire sealing region.

The inelastic carrier, which guarantees sufficient stiffness, can be locked into place axially on a brush holder with simple assembly. The electrical lines can also be electrically contacted, in a single work step, with contact pins held by the carrier, or contact eyes with corresponding contact recesses, or contact pins of the brush holder, so that a separate cover part on the face, which is locked in place on the brush holder, is no longer necessary. According to a further embodiment of the present invention, the inelastic carrier and the brush holder are formed in one piece.

BRIEF DESCRIPTION OF THE DRAWINGS

The present invention, as well as further advantageous developments of the present invention, will be explained in greater detail below, using embodiments shown schematically in the drawing.

DETAILED DESCRIPTION

Figure 1:
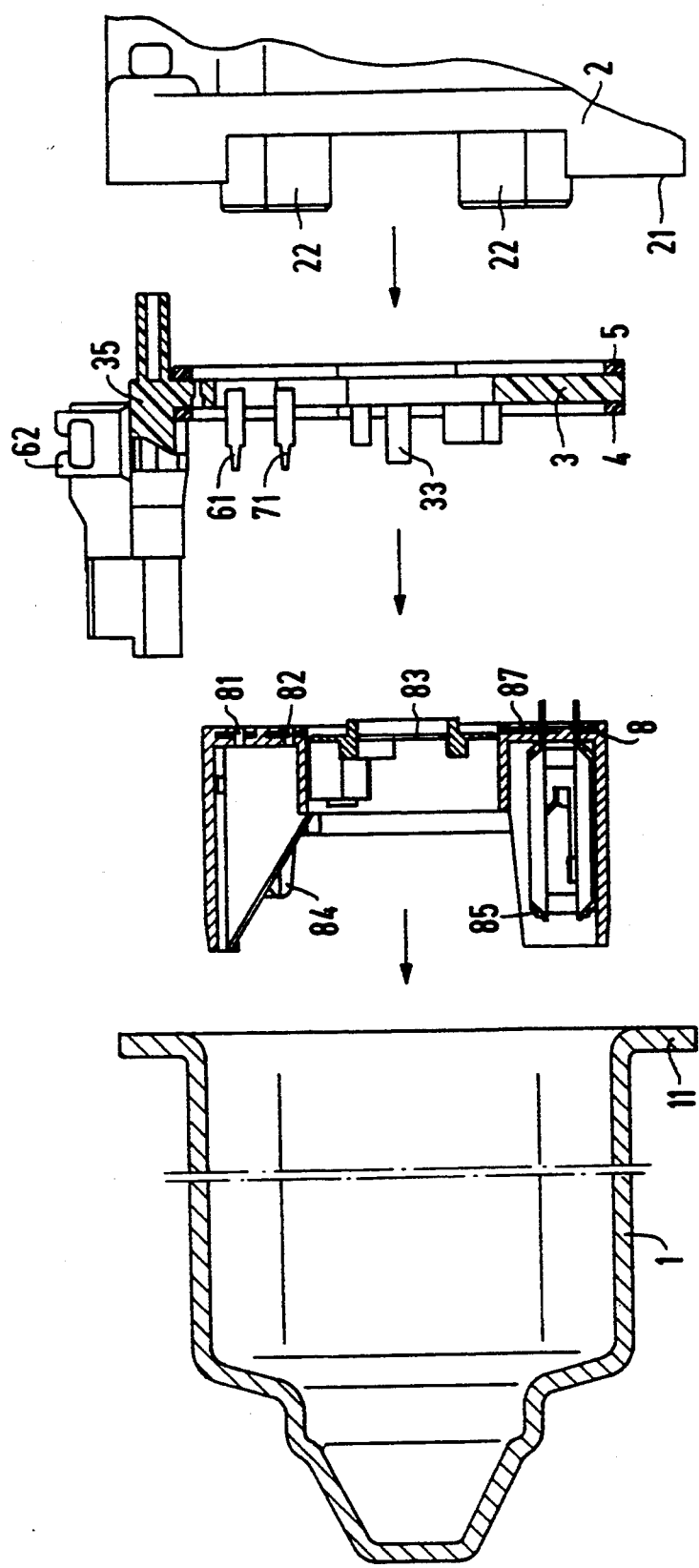
FIG. 1 is a partially exploded view of a commutator motor housing and a gear housing, which are to be connected in moisture-tight manner, with a brush holder arranged between them, and the carrier which surrounds the lines and holds the seal.

The present invention is applicable wherever two housings or housing parts are to be brought together with a seal therebetween. The drawing figures illustrate an embodiment of the present invention implemented in connection with a motor housing and a gear housing.

FIG. 1 shows a pot-shaped motor housing 1 of a commutator motor and a gear housing 2 that rests against and is attached to the motor housing 1, for example, in a motor vehicle window-raising mechanism. Before the motor housing 1 and the gear housing 2 are placed against one another, a brush holder 8 that holds brush boxes 84 and 85 is inserted into the motor housing 1 from the right open face. An inelastic carrier 3 having seals 4 and 5 injection-molded onto both faces is placed between the face 11 of the motor housing 1 and the face 21 of the gear housing 2.

Figure 2:
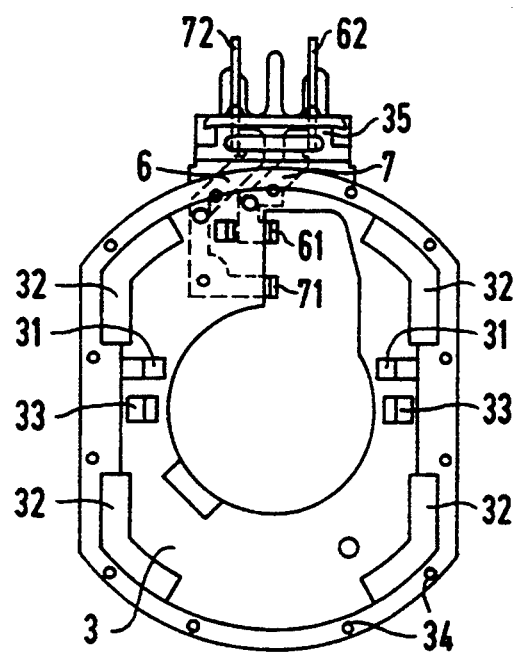
FIG. 2 is a front view of the face of the carrier provided with the lines and the seals.
Figure 5:
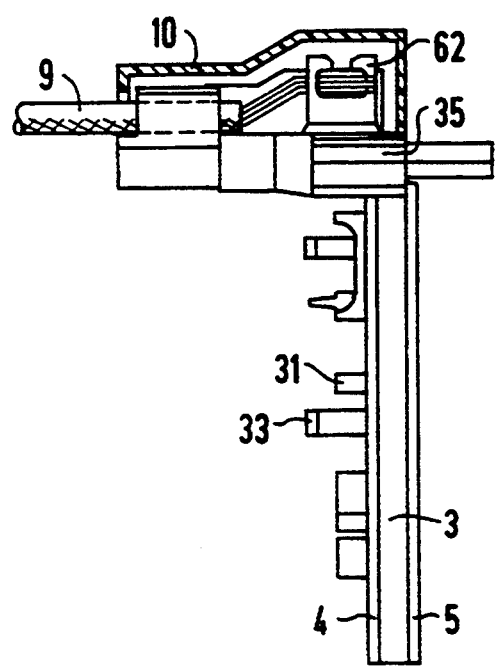
FIG. 5 is a radial side view of the carrier.
Figure 6:
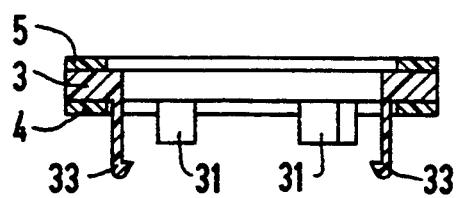
FIG. 6 is a view of the carrier along the plane VI—VI of FIG. 3.

As shown in FIG. 2, the electrical lines 6 and 7 are formed as punched and bent sheet metal parts, and are placed in the inelastic carrier 3 and covered by the carrier material at both faces, particularly by injection molding. The punched and bent sheet metal parts that represent the electrical lines 6 and 7 are connected to external solder eyes 62 and 72, to which insulated line ends of an external lead 9, as shown in FIG. 5, can be soldered. The punched and bent sheet metal parts that represent the electrical lines 6 and 7 are connected to contact plugs 61 and 71 that project axially from the inelastic carrier 3, and to which contact recesses 81 and 82 in the face of the brush holder 8 in FIG. 1 correspond.

Figure 3:
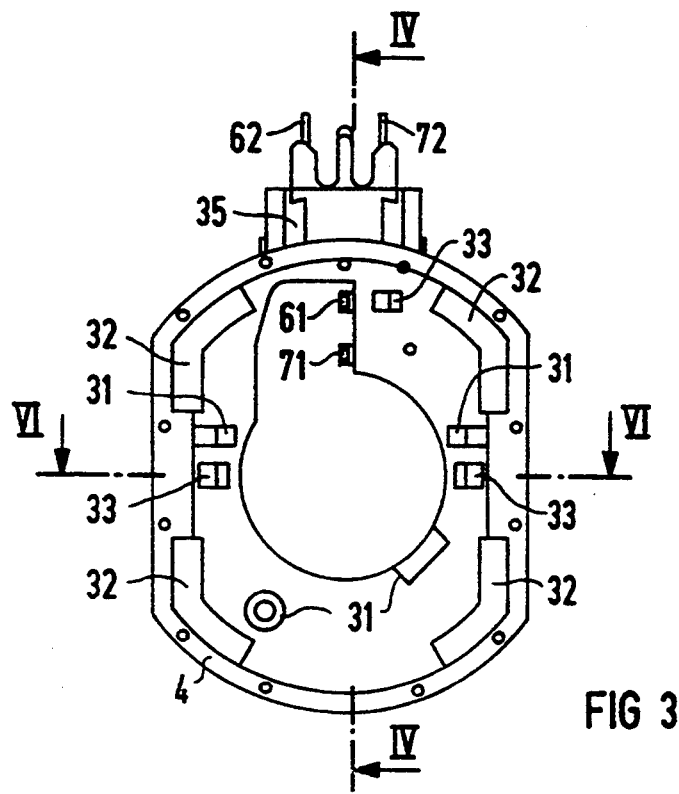
FIG. 3 is a rear view of the carrier provided with the lines and the seals.
Figure 4:
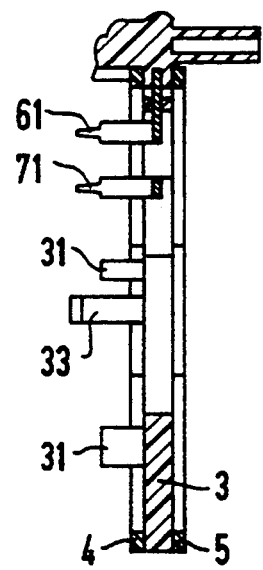
FIG. 4 is a view of the carrier along the plane IV—IV of FIG. 3.

Assembly of the sealing contact of the gear housing 2 on the motor housing 1 is accomplished by centering the openings 32, as shown in FIGS. 2 and 3, into which centering projections 22 of the gear housing 2 engage, to fix the position between the gear housing 2 and the seals 4 and 5 of the carrier 3. For simple axial assembly of the carrier 3, and the brush holder 8, axially projecting catch hooks 33, as illustrated in FIG. 1, are affixed on the carrier 3 which snap into place behind catch hook recesses 83 in the face of the brush holder 8. Contact recesses 81 and 82, which are an integral molded part of the pressed screen 87, serve for simultaneous electrical contacting of the contact plugs 61 and 71 of the lines 6 and 7 with the electrical lines of the brush holder 8. To guarantee that a space is maintained between the carrier 3 and the face of the brush holder 8, support cams 31 are distributed over the circumference of the carrier 3 and rest on the right face of the brush holder 8 in the reciprocal end operating position of the carrier 3 and the brush holder 8.

A support piece 35 is provided on the carrier 3, outside the motor housing 1 and the gear housing 2, which rests against an outer partial region of the motor housing 1 with its left part, pursuant to FIG. 5, and against an outer partial region of the gear housing 2 with its right part. To form a seal that insulates the solder connections of the external connection lead 9 with the solder eyes 62 and 72, there is a protective cap 10 that can be set into place after contacting. For additional anchoring of the seals 4 and 5 in the carrier 3, it is practical to provide anchoring bores 34 in the carrier 3, in which the seals 4 and 5, which are injection-molded on or set into place, can anchor.

As a result of the seals 4 and 5, which guarantee elasticity over the entire seal edge, and the fact that the electrical lines 6 and 7 are held and surrounded by the carrier material in the inelastic carrier element 3, a good uniform seal between the faces of the motor housing 1 and the gear housing 2 is guaranteed with simple production and assembly. The electrical lines can therefore be insulated without influencing the seal function, and the electrical contact between an external connection lead 9 via the electrical lines 6 and 7 is possible with few and easily-assembled components.

What is claimed is:

1. A bushing isolator for lead-through of electrical lines between two housing parts, comprising:
    an inelastic carrier;
    electrical lines completely injection-molded into the inelastic carrier and covered by both faces of the inelastic carrier; and
    an elastic seal injection-molded onto the inelastic carrier at both faces thereof such that the elastic seal is pressed evenly and uniformly only against a smooth and uniformly stable surface of the inelastic carrier, said elastic seal having equal elasticity over an entire surface of contact with the inelastic carrier, said elastic seal providing a complete and uniform moisture sealing between the housing parts.

2. A bushing isolator for lead-through of electrical lines between two housing parts, comprising:
    an inelastic carrier;
    electrical lines completely injection-molded into the inelastic carrier and covered by both faces of the inelastic carrier; and
    an elastic seal glued onto the inelastic carrier at both faces thereof such that the elastic seal is pressed evenly and uniformly only against a smooth and uniformly stable surface of the inelastic carrier, said elastic seal having equal elasticity over an entire surface of contact with the inelastic carrier, said elastic seal providing a complete and uniform moisture sealing between the housing parts.

3. The bushing isolator according to claim 1, wherein the elastic seal is an elastomer flexible plastic part and the inelastic carrier is a thermoplastic rigid plastic part.

4. The bushing isolator according to claim 1, wherein the inelastic carrier further comprises a support part that is molded onto a surface thereof.

5. The bushing isolator according to claim 4, wherein said support part includes connection plugs to connect said electrical lines to an external connection line.

6. The bushing isolator of claim 1, wherein said two housing parts are two housings, the bushing isolator is positioned between the two housings and one of the housings is a commutator motor housing of a commutator motor.

7. The bushing isolator according to claim 6, wherein the inelastic carrier axially engages a brush holder of the commutator motor.

8. The bushing isolator according to claim 7, wherein the inelastic carrier is provided with at least one catch hook that engages at least one recess in the brush holder of the commutator motor.

9. The bushing isolator according to claim 1, wherein said electrical lines comprise sheet metal parts.

10. The bushing isolator according to claim 7, wherein the inelastic carrier includes at least one contact pin that engages at least one contact recess in the brush holder to form an electrical connection between the electrical lines and the brush holder.

11. The bushing isolator according to claim 8, wherein the inelastic carrier includes at least one contact pin that engages at least one contact recess in the brush holder to form an electrical connection between the electrical lines and the brush holder.

12. The bushing isolator according to claim 1, wherein said elastic seal comprises a rubber part.

13. The bushing isolator according to claim 3, wherein said elastic seal comprises a polyolefin elastomer part.

14. The bushing isolator according to claim 3, wherein said inelastic carrier comprises a polyamide part.

15. The bushing isolator according to claim 3, wherein said inelastic carrier comprises a polyester part.

16. The bushing isolator according to claim 8, wherein said electrical lines comprise punched and bent sheet metal parts.

17. The bushing isolator according to claim 7, wherein said inelastic carrier and the brush holder are formed in one piece.

18. The bushing isolator according to claim 1, wherein said two housing parts are two separate housings.

19. The bushing isolator according to claim 1, wherein the two housing parts are a motor housing and a gear housing in a motor vehicle window-raising mechanism.

* * * * *